United States Patent [19]

Arimoto et al.

[11] Patent Number: 4,908,634
[45] Date of Patent: Mar. 13, 1990

[54] LASER POWER CONTROL FOR CUT-PAPER PRINTER

[75] Inventors: Akira Arimoto, Kodaira; Susumu Saito, Hachioji; Yasuyuki Tsuji; Osamu Namikawa, both of Katsuta; Takeshi Mochizuki, Mito, all of Japan

[73] Assignees: Hitachi, Ltd.; Hitachi Koki Co., Ltd., both of Tokyo, Japan

[21] Appl. No.: 293,116

[22] Filed: Jan. 3, 1989

[30] Foreign Application Priority Data

Feb. 9, 1988 [JP] Japan ................. 63-26645

[51] Int. Cl.⁴ ............................. G01D 15/14
[52] U.S. Cl. ................... 346/108; 358/296; 358/300; 346/160
[58] Field of Search ............ 346/108, 107 R, 160, 346/76 L; 358/296, 300, 302; 355/211, 234

[56] References Cited

U.S. PATENT DOCUMENTS 4,122,409 10/1978 Marlett et al. ............... 346/108
4,742,363 5/1988 Shiraishi ...................... 346/108

FOREIGN PATENT DOCUMENTS 54-13343 1/1979 Japan .

Primary Examiner—Bruce A. Reynolds
Assistant Examiner—Mark Reinhart
Attorney, Agent, or Firm—Fay, Sharpe, Beall, Fagan, Minnich & McKee

[57] ABSTRACT

Electric-photosensitive printing is accomplished with an LD providing a laser scanning beam that is modulated to affect printing, and the power output of the LED is maintained constant through negative feedback by a holding voltage provided by a capacitor having its charge determined only during a non-printing portion of the printing period wherein a plurality of sheets are printed. During the non-printing period, contact of the scanning laser beam with the electro-photosensitive material is disabled while the laser beam is maintained on so that its power may be measured and compared with a reference level to provide a feedback signal for controlling the output of the laser beam, particularly the feedback signal being provided to the holding capacitor only during the non-printing portion of the period, and the holding capacitor being isolated from the feedback signal during the printing portion of the period. As a specific embodiment, a rectangular sheet of electric-photosensitive material is replaceable wound around a drum so that its opposite ends are spaced apart to provide a seam to affect the disablement of the laser beam from contracting the electro-photosensitive material during the non-printing portion of the period, and a separate light source used to detect this seam portion to determine the non-printing portion of the period.

28 Claims, 2 Drawing Sheets

LASER POWER CONTROL FOR CUT-PAPER PRINTER

BACKGROUND OF THE INVENTION

The present invention relates to laser printers, wherein the laser power is modulated, particularly on and off, for activating or deactivating a photosensitive material in an electro-photographic process, particularly for cut paper.

A semiconductor laser, particularly a laser diode (LD) has recently become the leading laser light source for laser printers. In order to carry out a stable printing operation, the laser output must be kept constant. However, the semiconductor laser has a characteristic of varying its output with temperature. In order to eliminate such an inconvenient power variation with temperature, in an optical disc and an laser printer, a monitor with a photodetector is used to detect the laser output for negative feedback control operation in an attempt to maintain a constant output for the laser. For example, reference is made to Japanese Patent Laid-Open No. 13343/1979.

In these conventional printer techniques, a sample and hold operation is carried out, in which a monitor discretely detects the laser output in response to the laser beam moving past a photodetector provided at the start point of scanning. A negative feedback control operation is performed with respect to this detection so that the output of the laser is maintained constant during the printing time.

It is also known, with respect to the device such as an optical disc device, to have the laser device emit light in two directions, with one direction being used for scanning and the opposite direction being used for detection, which is convenient when the laser is always on such as in the optical disc reading mode.

SUMMARY

With respect to printer operation, the laser output is being modulated, particularly it is being turned off and on at a rapid rate during the scanning on only a single line, such modulation frequency is extremely high and it is impractical to consider monitoring the laser output continuously; that is it would be impractical to always monitor the laser output in one of its emitting directions while using the other emitting direction for printing purposes according to such modulation.

Currently, laser control as involved the scanning of one line and at the end or beginning of the scan for one line, the laser will be left on to eliminate a reflective portion of the drum that is not covered with paper and is not covered with the photosensitive material. Therefore, a photo-detector output would be obtained each time a line is scanned by the laser. Even with this method, the detection frequency is one to ten kilohertz, which is a rather high frequency. Also, there is the disadvantage that the scanning width must be increased beyond the edge of the paper to perform this detection of the beam intensity. Increasing the scanning width increases the scan time, which is undesirable, and further increasing the scanning width places more severe requirements on the mechanism producing the scanning.

In the above example of the convention system, the sample and hold control operation is carried out at the beginning of every scanning operation, that is at a rate of hundreds to thousands of hertz. It is predicted that in the future this frequency will increase, due to improvements of the resolution and printing speed. This increase in scanning rate or frequency will cause severe problems concerning the circuit configuration of a sample and hold control system, because of the predicted increase in operation frequency of the circuit. Many problems start to occur with respect to such a circuit at high frequencies.

It is an object of the present invention to obtain a reliable power output control for such a laser scanning printing system. It is a particular object to reduce the frequency of the sample and hold control operation. It is further object to obtain these results without increasing the width of the scan beyond that required for printing.

These and other objects are achieved, with respect to a cutpaper by providing a reflective area, extending longitudinally with respect to the photosensitive drum, wherein there is not photosensitive material and which reflective area is within the confines of the paper width, measured longitudinally with the drum. This reflective area is conveniently obtained by a seam portion of the photosensitive material. With a seam portion, advantages are obtained that the photosensitive material may be inexpensively provided in sheet form and wrapped on the drum for cost effective installation and replacement. Accordingly, the negative feedback of the laser is controlled according to the reflective laser beam as detected from this reflective or seam portion, at sample and hold frequency of once per multiple of printed sheets, for example one Hertz as opposed to thousands of Hertz in the past.

According to the present invention, the seam of the photo sensitive material turns to the laser scanning position only once during the printing of one or an integer multiple of one sheets of cut paper being printed. Therefore, the sampling and holding, particularly the controlling of the negative feedback of the laser beam output every time the steam turns to the laser scanning position enables the sampling frequency to be reduced to an extremely low level. For example, the reduction may be in the order of a ratio of 1,000 or more. The detecting operation can be carried out in a period of time as long as one to two seconds, for example at a frequency of 0.5 to 1 Hertz.

In order to obtain a photosensitive drum with a seamless photosensitive member, it is necessary that a uniform film of photosensitive material, such as Se and Si be formed on a substrate of the drum by using special techniques, such as evaporation or sputtering. The substrate is quite expensive. According, when this photosensitive material is exhausted the entire drum must be removed and replaced, which is expensive. The present invention may be applied to such a photosensitive drum wherein the photosensitive material is initially applied in a uniform seamless manner, and thereafter a seam is formed by coating reflective material in an axially extending strip across the previously coated uniform film of photosensitive material. However, such a seam, while usable in the present invention, still has the disadvantage that it is costly to replace the exhausted photosensitive material and has a further disadvantage that the manufacturing cost is increased with the additional step of coating the reflective material to form the seam.

Therefore, the preferred form of the present invention is to obtain a photosensitive drum with a seamed photosensitive member, by wrapping a sheet-type photosensitive material around a substrate drum. With such a formation, this photosensitive material can easily be replaced with a similar sheet of new material, without replacing the entire drum, in a cost effective manner. It is known to mechanically attach the photosensitive material to the drum in this manner or to feed the photosensitive material from a coil within the drum through a slot in the drum, around the periphery of the drum, and back into the center of the drum through another slot closely adjacent to the first slot to be wound upon a take-up reel; thereby the photosensitive material may be selectively changed by merely rotating the reel supplying the material and the reel taking up the material. In such a two reel system, the drum portion between the slots would be reflective and provide the seam for seam detection of the present invention.

With seam detection according to the present invention, the paper feed is preferably that of cut paper, with the paper not overlying the seam. Within the broad meaning of cut paper, is the possible configuration of continuous form fed paper, wherein the window is provided in the continuous form between adjacent sheets of paper, that is the adjacent sheets of paper will have a cutout blank window area to simulate separate cut sheets of paper being fed to the drum with a seam spacing between them. With continuous pin form feeds, the window would be positioned so as to overlie the seam, that is the adjacent sheets of the continuous forms would be cut on each side of the window and therefore no paper would be overlying the seam of the drum.

When the seam turns to the laser scanning position, a difference of reflectance between the photosensitive material and the seam is read by a photo detector and separate light source, and the laser beam is left on at the time that the seam is scanned. The optical output from the scanning laser beam detection is obtained with a monitor photo detector, for example, a photo diode. This detected output is then sent to a controller, to be compared with a reference level. The result of this comparison is used as a negative feed-back signal for controlling the power output of the laser device. This control is maintained so that the output of the laser device remains constant despite changing conditions that would otherwise affect its output.

BRIEF DESCRIPTION OF THE DRAWINGS

Further objects, features and advantages of the present invention will become more clear from the following detailed description of a preferred embodiment, as shown in the drawing, wherein.

DETAILED DESCRIPTION

Figure 3:
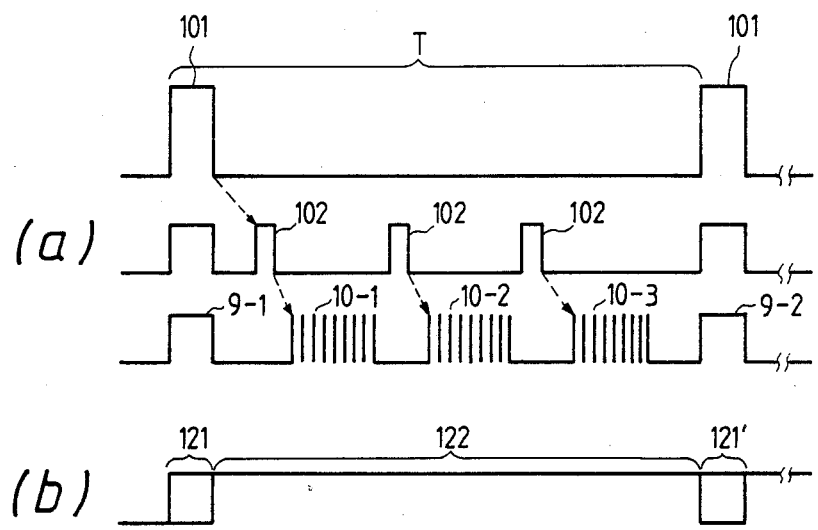
FIGS. 3a and 3b are time charts showing the timing of various signals, according to the embodiment of the present invention.

With reference to FIG. 3, the drum of the printer according to the present invention, will perform one complete rotation during the period T. The signal pulses 9-1 and 9-2 are respectively provided at a nonprinting portion of the period T, e.g., at the beginning of separate periods T, and they turn on the laser beam for a relatively long non-printing portion of the period T, during which time light communication between the laser and the photosensitive material is disabled, e.g., when the seam is being scanned. That is, for example, the laser is left on for the entire width of pulses 9-1 and 9-2, at the beginning of each period T for scanning the seam of the drum. Within the period T, more specifically between pulses 9-1 and 9-2, there are groups of pulses 10-1, 10-2, 10-3, which may be provided in any number 10-n, wherein n is an integer positive whole number equal or greater than 1 and corresponding to the number of sheets being printed. For example, the group of pulses 10-1 correspond to the times that the laser beam is turned on for producing the light and dark areas during the scanning and printing of one line. Even though only a few pulses have been shown, for example with respect to pulses 10-1, it is to be understood that thousands of these pulses would be present to scan one line and more particularly one sheet of paper. Preferably, n equals two or more, so that two or more sheets of paper may be printed for each rotation of the drum. The time period T, is currently in the order of several to several tenths of seconds. The level of the output of the laser beam is detected during periods 9-1 and 9-2, compared with a reference level and corrected according to a feed back circuit, all within a nonprinting portion of the period, so that this corrected value is then maintained during the subsequent time periods 10-1, 10-2, 10-n.

Since the seam consists of the surface portion of the drum that does not have exposed photosensitive material, and more particularly to an exposed portion of the drum that does not have any photosensitive material, there is therefore no possibility that the seam will cause toner to be deposited on that portion of the drum where the seam is located, so that no developing will take place as a result of the seam. This is true even if the printer if of a reversal development system in which the laser beam is maintained in an off-state for a major portion of the time. That is, the present invention is equally advantageously applicable to both positive and negative latent image forming systems using a laser beam.

Where the present invention has been set forth with respect to a drum being a cylindrical member, the term drum herein is used in a broader context to refer to a rotatable endless surface, which, for example, could be formed with a belt supported by spaced-apart drive sprockets, cylinders or the like.

Figure 1:
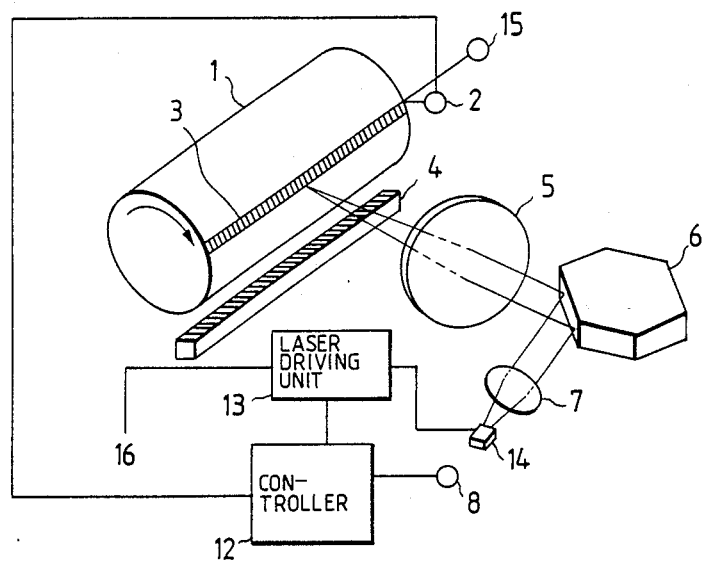
FIG. 1 shows a schematic construction diagram of one embodiment of a laser printer according to the present invention.

A specific form of the cut-paper laser printer is illustrated in FIG. 1. A drum 1, having a photosensitive surface is formed by a cylindrical drum having a substrate covered by a rectangular sheet of electro-photographic material, which is attached to the drum so that the opposite end edges of the material will be closely spaced apart and formed therebetween a seam 3, wherein the underlying reflective surface of the drum 1 is exposed for a substantial peripheral extend across the entire axial dimension of the drum 1. That is, the seam 3 extends parallel to the rotatable axis of the drum and provides a non-printable portion of the period, which period is one rotation of the drum 1. A nonprintable portion detector, particularly a photo-detector 2 is closely adjacent to the drum 1, to detect the light from the seam detecting laser diode (LD) 15 that is reflected from the seam 3, when the seam 3 is rotated past the detector 2. In a known manner, the laser beam may be scanned axially along the surface of the drum. Light reflected from the seam 3 during the entire scanning operation of the seam will be reflected back to the detector 2.

A laser beam emitted from a scanning semiconductor laser 14 will pass through a collimating lens 7, to be reflected by the polygonal rotating mirror 6, with the collimated reflected laser beam then passing through the focusing lens 5, where it is focused upon the drum 1 to form a latent image when the laser beam strikes the photosensitive material of the drum 1, which is thereafter developed on the paper with the developer 4, according to known technology. During the non-printing portion of the period, the laser beam will be disabled from activating the photo sensitive material on the drum, for example by the presence of the seam, so that this normal latent image producing and subsequent development printing process will not be performed even if the laser beam is left on.

During the non-printing portion of the period, the laser 14 is left on, and light beam emitting from the laser, for example from the rear of the laser as shown in FIG. 1, will be detected by a detector, for example detector 8 in FIG. 1. The signal from detector 8 will be sent to controller 12 to control the driver 13 which supplies the power to the laser 14 by modifying a source of power 16, all when enabled by the signal from the non-printing portion detector 2.

Figure 2:
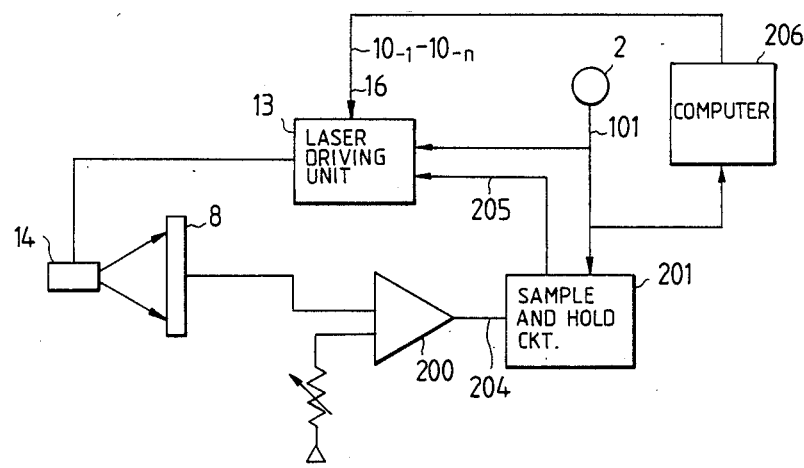
FIG. 2 schematically illustrates a controller employed with the embodiment of FIG. 1.

With respect to the specific embodiment, the operation of the controller will not be described with reference to FIGS. 2 and 3. On the basis of a signal 101 obtained by detecting the non-printing portion of the period, specifically by detecting the seam 3 on the photosensitive drum 1 by the seam detecting photodetector 2 that monitors reflected light from the LD light source 15, signals 102 for transferring the paper to be printed are sent out periodically, as shown in FIG. 3a. FIG. 3 shows an example in which three sheets of paper are printed for each period, that is for each single revolution of the photosensitive drum 1. Of course, periods may be defined according to multiple rotations of the drum, or other methods, and preferably include the printing of more than one sheet of paper. The turning on of lighting signals for the scanning laser 14 are shown in FIG. 3, with respect to portion (a) of the figure. These automatic power control, APC, signals including 9-1, 9-2 are generated synchronously with the non-printing portion detection signals 101 as produced specifically by the seam 3 and photosensitive drum. The printing signals 10-1, 10-2, 10-3, etc. for the paper to be printed are provided between the APC signals for one period. When the APC signals 9-1, 9-2, etc. are obtained, the scanning laser 14 is turned on synchonicously for a time represented by these APC signals 9-1, 9-2 being in their high state. Of course, FIG. 3 represents the signal amplitude in the vertical direction, for example voltage, and time in the horizontal direction, specifically fractions of a second. The signal generated at this time by maintaining the laser beam 14 on during the existence of the APC signals 9-1 and 9-2 is monitored by photo-detector 8 as shown in FIGS. 1 and 2. A voltage representative of an optical output from the monitor photo-detector 8 is compared with a preset reference voltage VR in a comparator 200 to obtain a differential signal 204. The differential signal 204 is sent to a laser driver 13 through line 205 from a sample and hold circuit 201. The laser driver 13 is adapted to compensate for the difference between the voltage from detector 8 and the above mentioned preset voltage VR and thereby controls the laser power of scanning laser 14. The sample and hold circuit 201 is operated only when the detected signal 101 of the seam 3 is inputted to it to indicate the existence of the seam 3 at the laser scanning position. FIG. 3b is a diagram showing the peak value of the laser beam, wherein the sampling time 121 and holding time 122 are shown. In the final part of the holding time 122, the level of the laser output and the preset level becomes slightly different due to the temperature, variation of the semiconductor laser, and this difference is detected and compensated for in the subsequent sampling time 121'.

Figure 4:
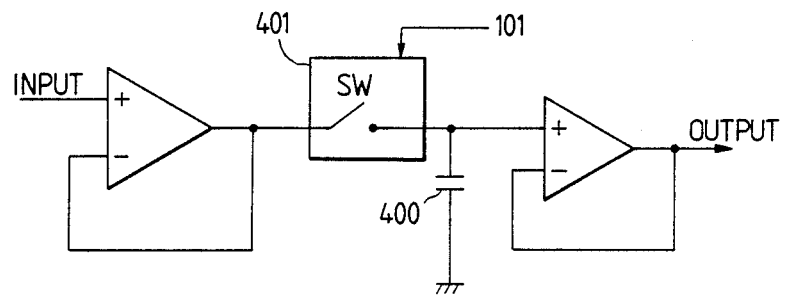
FIG. 4 is a schematic diagram of a circuit for maintaining the scanniing laser beam output at a constant level.

During the data printing time represented by the occurrence of signals 10-1 through 10-3, the magnitude of the signals in the line 205 of the above mentioned compensation is kept constant by the circuit using a capacitor 400, an example of such a circuit being shown in FIG. 4. The value of such compensation can be kept constant for a certain predetermined period of time by the capacitor 400 as shown in FIG. 4.

However, when a sampling switch 401 is turned off by the absence of the signal 101, the electric charge runs off little by little from the capacitor 400. Therefore, it is necessary to periodically reset the value of the capacitor 400. According to the present invention, such resetting time is such that it is in agreement with the time at which seam 3 on the photosensitive drum 1 is scanned with the laser 14.

It is necessary that the signal 101 for detecting the seam 3 on the photosensitive drum 1 be sent to a computer 206 at the same time that it is sent to the circuit 201. This signal 101 is used to designate the time 10-1, 10-2, 10-3, etc. at which the data to be printed are to be fed, at each printing paper feed time 102 with respect to cut sheets.

Even when the scanning laser is turned on to stabilize the laser output on the photosensitive member, there is no possibility that the toner is deposited on the photosensitive drum. This is true because the seam is provided to receive the scanning laser when it is left on during the stabilization non-printing time, and the seam does not contain any photosensitive material. Therefore, this technique is capable of preventing the deposition of toner on the portion of the drum with the light from the scanning laser when the laser is left on during the non-printing or stabilization portion of the period.

When a beam out-put stabilizing scanning laser is turned on for a predetermined period of time on the photosensitive member for reversal development, on which a portion to be scanned is not specially limited to a seam, a large quantity of toner is necessarily deposited on the photosensitive member. Even in such a case, the deposition of a large quantity of toner on the photosensitive member can be prevented if the photosensitive drum having a seam carrying photosensitive member is used as in the present invention, and that the steps of scanning the seam 3 with a beam of the scanning laser 14 and the controlling the laser output so as to stabilize the same are accomplished at the same time. Alternatively, some other device or method may be employed for disabling the laser scanning beam from contacting photosensitive material during the non-printing portion of the period. For example, when the non-printing portion of the period is detected by some monitor of drum rotation, or some monitor of paper positioning, or some monitor of a division between sheets of paper of continuous fed paper, or determined through software from the computer 206, various techniques may be used to interrupt the travel of the scanning laser to the photosensitive material. For example, a shutter may be moved within the path of the scanning beam during the non-printing portion of the period. Instead of monitoring the light emitted from the back end of the laser 14 by the detector 8, detector 8 may be moved to a position beneath the lens 7, and a mirror may be swung into position between the laser 14 and lens 7 during the non-printing portion to reflect the laser scanning beam to the detector 8.

During the non-printing portion of the period, stabilizing beam output from the scanning laser is accomplished every time the non-printing portion is determined or sensed or decided upon, and with specific reference to the preferred embodiment, every time the seam of the photosensitive member is turned to the scanning position. This enables the sampling frequency to be reduced to an extremely low level as compared to a situation wherein stabilizing according to the prior art is accomplished each time the laser beam is turned on during normal printing scanning or at the end of each line. Accordingly, the frequency characteristics of the circuit according to the present invention, particularly the sample and hold control system can be set at a low and stable level as compared to the prior art.

While preferred embodiments along with variations and modifications have been set forth for disclosing the best mode and important details, further embodiments, variations and modifications are contemplated according to the broader aspects of the present invention, all as set forth in the spirit and scope of the following claims.

We claim:

1. In a laser scanning printer system, wherein a laser beam is modulated to affect printing as it scans a rotatable member with a repeatable scan cycle of relative scan movement between the rotatable data recording medium and the laser beam, and feed relative movement at right angles to said scan movement between cycles, wherein the improvement comprises:

said rotatable member having a non-printing surface without any data handling capability, and extending for a length corresponding to at least one scan cycle, and being in the path of said laser beam only for a non-printing portion of the period representing the entire path of relative feed movement of laser beam and rotatable medium that traverses the entire data region of said recording medium in said feed direction; and means for correcting the power of the laser beam only during said non-printing portion so that the frequency of light reflection between said laser beam and said non-printing surface is equal to the frequency of scan lines divided by a relatively large whole number integer.

2. Device of claim 1, wherein said whole number integer is greater than the number of scan lines to print a minimum standard size sheet of paper.

3. The device of claim 2, including LD means for producing said laser beam with an output power controllable by a negative feedback signal;

means for maintaining said laser beam on when aligned with said non-printing surface;

photosensitive detective means for detecting the light from said LD means and producing a scan light signal correlated to light power;

means comparing said scan light signal and a reference signal and producing said negative feedback signal only when said laser beam is traversing said non-printing surface for stabilizing the light emitted by said LD means; and means holding said negative feedback signal for said LD means for a time at least sufficient to provide relative feeding movement between said laser beam and said rotatable member for the printing remainder of the period.

4. A laser scanning system as a part of an electro photographic printing system, comprising:

a laser scanning light source producing a laser beam with negative power feedback;

a drum; means for relatively moving said drum and said laser beam axially with respect to each other for a scanning cycle;

means for relatively moving said drum and said laser beam peripherally of said drum for a repeatable feed period;

an electro-photosensitive member substantially covering the operative portion of said drum except for an axially extending seam wherein a light reflective portion of said drum is exposed between adjacent opposite ends of said photosensitive member;

means for maintaining said laser scanning light source on while traversing said seam;

means for detecting the power of said laser beam while traversing said seam and producing a control signal; and means for controlling the negative feedback of said laser scanning light source in response to said control signal by producing a feedback signal for maintaining said laser beam output power constant.

5. The device of claim 4, including said means for controlling being operative only when said laser beam is traversing said seam; and holding circuit means for holding said feedback signal for a length of time at least sufficient for the repeat period of said laser beam during normal operation.

6. The device of claim 5, wherein said means for detecting is a photo-detector, and wherein said laser scanning light source is an LD.

7. The device of claim 4, wherein said electro-photosensitive member is a rectangular sheet of electro-photosensitive material wound around said drum and removable held on said drum for periodic replacement.

8. The device of claim 6, wherein said holding circuit means including a holding capacitor directly connected to the negative feedback terminal of said laser scanning light source.

9. The device of claim 4, wherein said laser scanning light source has negative feedback control means for receiving a negative feedback signal, comparing the same with a reference signal, and controlling the output power of said laser scanning light source to stabilize at a constant value independent of temperature variations and the like.

10. The device of claim 4, including means for feeding a sheet of paper around said drum so that said seam extends adjacent the upper or lower edge of said sheet of paper; and wherein the peripheral length of said drum is greater than the corresponding length of a plurality of sheets of paper so that the seam is traversed by said laser beam only once for the printing of a plurality of sheets of paper.

11. The device of claim 4, including means for producing a paper transfer signal; and said means for maintaining being operative only once for every plurality of paper transfer signals.

12. The device of claim 6, wherein said holding circuit means including a holding capacitor; a switch means connecting said capacitor to said feedback signal only when said laser beam is turned on by said means for maintaining; the opposite end of said capacitor from said feedback signal being operatively connected to said means for controlling for maintaining a substantially constant reference voltage selectively changeable only when said switch means is closely to operatively connect said holding capacitor with said feedback signal.

13. A laser scanning system as a part of an electro-photographic printing system, comprising: a laser scanning light source producing a laser beam with a negative feedback;
    a rotatable member having electro-photosensitive material thereon for producing a latent image according to the modulation of a lesser scanning beam produced by the laser scanning light source;
    means for modulating the laser beam of the laser scanning light source for producing a latent image corresponding to a plurality of scan lines during the printing portion of a repeatable period or rotation of said rotatable member;
    means for relatively moving said rotatable member and said laser beam for providing said scanning lines and line feed for the printable portion of the repeatable period, with said printable portion corresponding to a whole number multiple of a page length;
    means for providing a stabilizing period determining control signal for a non-printable portion of said period;
    means for disabling contact between said scanning laser beam and said electro-sensitive material on said rotatable member during said non-printable portion of said period even with said laser scanning light source being on;
    means for detecting the power of said laser beam while it is maintained on during said non-printable portion of said period and thereby producing a correlated power signal; and
    means responsive to said power signal for controlling the negative feedback of said laser scanning light source to set the power of said laser scanning light source at a constant level during said non-printing portion of said period and including means for maintaining said level during the printing portion of said period independently of said means for detecting.

14. The device of claim 13, wherein said means for controlling includes producing a feedback signal during said non-printing portion of said period, holding said feedback signal during the printing portion of said period, and applying said feedback signal to said laser scanning light source.

15. The device of claim 14, wherein said laser scanning light source is an LD.

16. The device according to claim 15, wherein said laser scanning light source has a negative feedback terminal; and said circuit means includes a capacitor directly connected to the negative feedback terminal of said laser scanning light source.

17. The device of claim 16, wherein the peripheral length of said rotable member is greater than the length of a plurality of sheets of paper being printed by said printing system; and further including means for producing a paper transfer signal; said means for detecting the power being operative only during said non-printing period occurring only once for every plurality of separate paper transfer signals.

18. The device according to claim 17, further includes switching mean connecting said capacitor to said feedback signal only when said laser beam in turned on during said non-printing period; and means connecting the opposite end of said capacitor from said feedback signal operatively to said negative feedback terminal to provide a substantially constant reference voltage throughout said period and selectively changeable only when said switch means is closed to operatively connect said holding capacitor to said feedback signal.

19. A method of electro-photosensitive printing, comprising the steps of:
    producing a laser scanning beam with a negative feedback;
    producing a latent image, on a rotatable member having electro-photosensitive material, according to modulation of the laser scanning beam;
    modulating the laser scanning beam for producing a latent image corresponding to a plurality of scan lines during the printing portion of a repeatable period of rotation of said rotatable member;
    relatively moving said rotatable member and said laser scanning beam for providing said scanning lines and line feed for the printable portion of the repeatable period, with said printable portion corresponding to a whole number multiple of a page length;
    providing a stabilizing period determining control signal for a non-printable portion of said period;
    disabling contact between said scanning laser beam and said electro-photosensitive material on said rotatable member during said non-printable portion of said period and maintaining said laser scanning beam on;
    detecting the power of said laser beam while it is maintained on during said non-printable portion of said period and thereby producing a correlated power signal;
    in response to said power signal, controlling the negative feedback of said laser scanning beam to set the power of said laser scanning beam at a constant level during said non-printing portion of said period, and maintaining said level during the printing portion of said period independently of said detecting.

20. The method of claim 19, wherein said controlling includes producing a feedback signal during said non-printing portion of said period and holding said feedback signal during the printing portion of said period, and applying said feedback signal to said laser scanning beam feedback.

21. The method of claim 20, producing a paper transfer signal for each of a plurality of sheets of paper being printed; and
    said detecting power being operative only during said non-printing period occurring only once for every plurality of separate paper transfer signals.

22. The method according to claim 21, further includes switching a capacitor to said feedback signal only when said laser scanning beam is turned on during said non-printing period; and
    connecting the opposite end of said capacitor from said feedback signal operatively to said negative feedback to provide a substantially constant reference voltage throughout said period and selectively changeable only when said switching operatively connects said holding capacitor to said feedback signal.

23. The method of claim 20, further includes switching a capacitor to said feedback signal only when said laser scanning beam is turned on during said non-printing period; and connecting the opposite end of said capacitor from said feedback signal operatively to said negative feedback to provide a substantially constant reference voltage throughout said period and selectively changeable only when said switching operatively connects said holding capacitor to said feedback signal.

24. The method of claim 19, producing a paper transfer signal for each of a plurality of sheets of paper being printed; and said detecting power being operative only during said nonprinting period occurring only once for every plurality of separate paper transfer signals.

25. The method of claim 19, wherein said steps of disabling and maintaining are performed continuously for at least one complete scan line.

26. The method of claim 25, wherein said steps of disabling and maintaining are performed only once for a plurality of scan lines equal to a whole number multiple of pages.

27. The method of claim 26, wherein said controlling includes producing a feedback signal during said nonprinting portion of said period and holding said feedback signal during the printing portion of said period, and applying said feedback signal to said laser scanning beam feedback.

28. The method of claim 25, wherein said controlling includes producing a feedback signal during said nonprinting portion of said period and holding said feedback signal during the printing portion of said period, and applying said feedback signal to said laser scanning beam feedback.

* * * * *